DIGITAL DATA STORAGE CIRCUIT

Filed Jan. 23, 1956 2 Sheets-Sheet 1

INVENTORS
ARTHUR W. VODAK
CURTIS M. JANSKY
BY R. V. Craddock
ATTORNEY

Aug. 19, 1958 C. M. JANSKY ET AL 2,848,709

DIGITAL DATA STORAGE CIRCUIT

Filed Jan. 23, 1956 2 Sheets-Sheet 2

INVENTORS
ARTHUR W. VODAK
CURTIS M. JANSKY
BY R. J. Craddock
ATTORNEY

United States Patent Office 2,848,709

Patented Aug. 19, 1958

2,848,709

DIGITAL DATA STORAGE CIRCUIT

Curtis M. Jansky, New York, and Arthur W. Vodak, Garden City, N. Y., assignors to Sperry Rand Corporation, a corporation of Delaware Application January 23, 1956, Serial No. 560,487

5 Claims. (Cl. 340—173)

This invention relates to digital data storage circuits, and more particularly, is concerned with a relay circuit for storing pulse data received in serial form.

Digital systems utilizing coded information in which the presence of a pulse during a selected time interval represents the binary digit 1 and the absence of a pulse represents the binary digit 0 are well known. It is frequently desirable in such systems to store the coded information as it is received in time sequence, referred to as digital information in serial form, and to read out the stored information in parallel form, that is, in a form in which all the digits stored are read out simultaneously on as many separate channels. One well known circuit for achieving this function is the shifting register, which can be used to receive pulse data in serial form and to read out the data (or binary word as it is frequently called) in parallel form. A storage circuit performing the above function may be used, for example, in converting the serially generated digital information to an analog voltage.

The general object of the present invention is to provide a greatly simplified circuit for performing the function of storing a binary word in a form in which the word can be read out continuously from the storage circuit in parallel form.

Another object of this invention is to provide a binary data storage circuit in which automatic resetting of the separate parallel channels takes place sequentially as a new binary word is fed into the storage circuit.

These and other objects of the invention which will become apparent as the description proceeds are achieved by the provision of a storage register for storing a binary word received in the form of pulse or no pulse during successive digit intervals in which the storage register comprises a plurality of "and" circuits, each of which controls an associated latch-relay. The binary word is fed to each of the "and" circuits and commutating means, synchronized with the binary word, feeds a pulse to each of the "and" circuits in succession at the repetition frequency of the digit intervals in the binary word. Thus if a binary word pulse (corresponding to the binary digit 1) is received by the "and" circuit during the time the "and" circuit is pulsed by the commutating means, the associated relay is energized. If no pulse (corresponding to the binary digit 0) is received by the "and" circuit during the time the "and" circuit is pulsed by the commutating means, the associated relay is not energized. Thus a succession of energized and non-energized relays is established in response to the received binary word. The clearing of the relays is achieved by having the clearing coil of each relay energized by the commutating means in succession by the same pulse fed to the "and" circuit associated with the preceding relay, whereby each relay is cleared as the preceding relay is reset and just prior to being reset itself.

For a better understanding of the invention reference should be had to the accompanying drawings, wherein.

Figure 1:
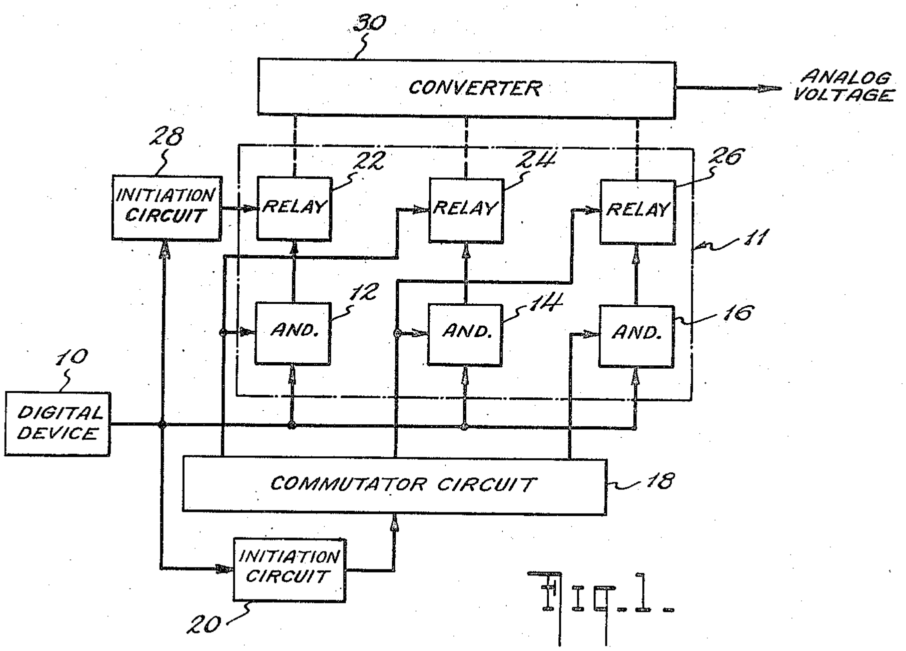
Fig. 1 is a block diagram of the present invention incorporated in a system.
Figure 4:
Fig. 4 is a graphical plot of typical binary word information as received by the data storage circuit.

Referring to Fig. 1, the numeral 10 indicates generally a digital device, such as a digital computer, a teledata receiver or similar digital means for generating a binary pulse data output. The output of the digital device 10 is preferably in the form of pulses during successive digit intervals representing binary 1 digits and with the absence of pulses during successive digit intervals representing binary 0 digits. A binary word produced by the digital device 10 includes a predetermined number of digits, preferably preceded by a long pulse which identifies the start of the binary word and is used for synchronizing the data storage circuit. Fig. 4 shows a typical output pulse train comprising a binary word as received from the digital device 10. While a long pulse is preferably utilized for identifying the start of the binary word, it will be understood that the circuit can be adapted to use other synchronizing means, such as, for example, a pulse doublet or a pulse of opposite polarity, which may be utilized to distinguish the synchronizing or initiating pulse from the digital pulses.

The output from the digital device 10 is coupled to a plurality of "and" circuits, the number of "and" circuits corresponding in number to the number of digits in the binary word. By way of example, three "and" circuits, indicated at 12, 14 and 16, are shown. The "and" circuits, hereinafter more fully described, are characterized by the fact that they produce an output only when two input signals are simultaneously applied thereto.

The second input to each of the "and" circuits 12, 14 and 16 is connected to a commutator circuit indicated generally at 18. The commutator circuit is arranged to apply a suitable pulse successively in point of time to the "and" circuits in time synchronism with the successive digital information pulses from the digital device 10. An initiating circuit 20, coupled to the output of the digital device 10, responds to the initial long pulse preceding the binary word for starting the switching action of the commutator circuit 18. The output from each of the "and" circuits 12, 14, and 16 are coupled to an associated latch-type relay, such as indicated at 22, 24 and 26 respectively. Each of these relays includes a setting coil and a clearing coil, as will hereinafter be more fully described, the setting coil of each relay being energized in response to the output of the associated "and" circuit. The outputs of the commutator circuit 18 are also connected to respective ones of the clearing coils of the relays, the first commutator output being connected to the clearing coil of the second relay 14, the second output of the commutator circuit being connected to the clearing coil of the third relay 16, and so forth. By this arrangement the commutator circuit 18 while actuating the first "and" circuit 12 is clearing the second relay 24 and while actuating the second "and" circuit 14 is clearing the third relay 26. The clearing coil of the first relay 22 is actuated by an initiating circuit 28 which responds to the long pulse at the start of a binary word from the digital device 10.

The relays 22, 24, 26 may actuate switches in a voltage divider type converter circuit 30, of a type described in Patent No. 2,658,139 for example, to produce an analog voltage output dependent on the pattern established on the relays as established by the binary word from the digital device 10.

With one pulse being fed to the first "and" circuit 12 from the commutator 18 at a time corresponding to the first digital pulse interval of the binary word produced by the digital device 10, if the first digit of the binary word is a 1, a second pulse will be fed to the "and" circuit 12 producing an output therefrom which energizes the relay 22. The commutator circuit 18 then produces a pulse which is fed to the second "and" circuit 14 during the second digital pulse interval of the binary word produced by the digital device 10. If the second digit in the binary word is a 0, no pulse will be fed to the "and" circuit 14 during this interval from the digital device 10 and hence the relay 24 will not be energized. By this means successive relays are either energized or not energized depending upon whether a pulse, corresponding to the binary digit 1 or no pulse, corresponding to the binary digit 0, is received by the corresponding "and" circuit during the particular binary digit interval.

Figure 2:
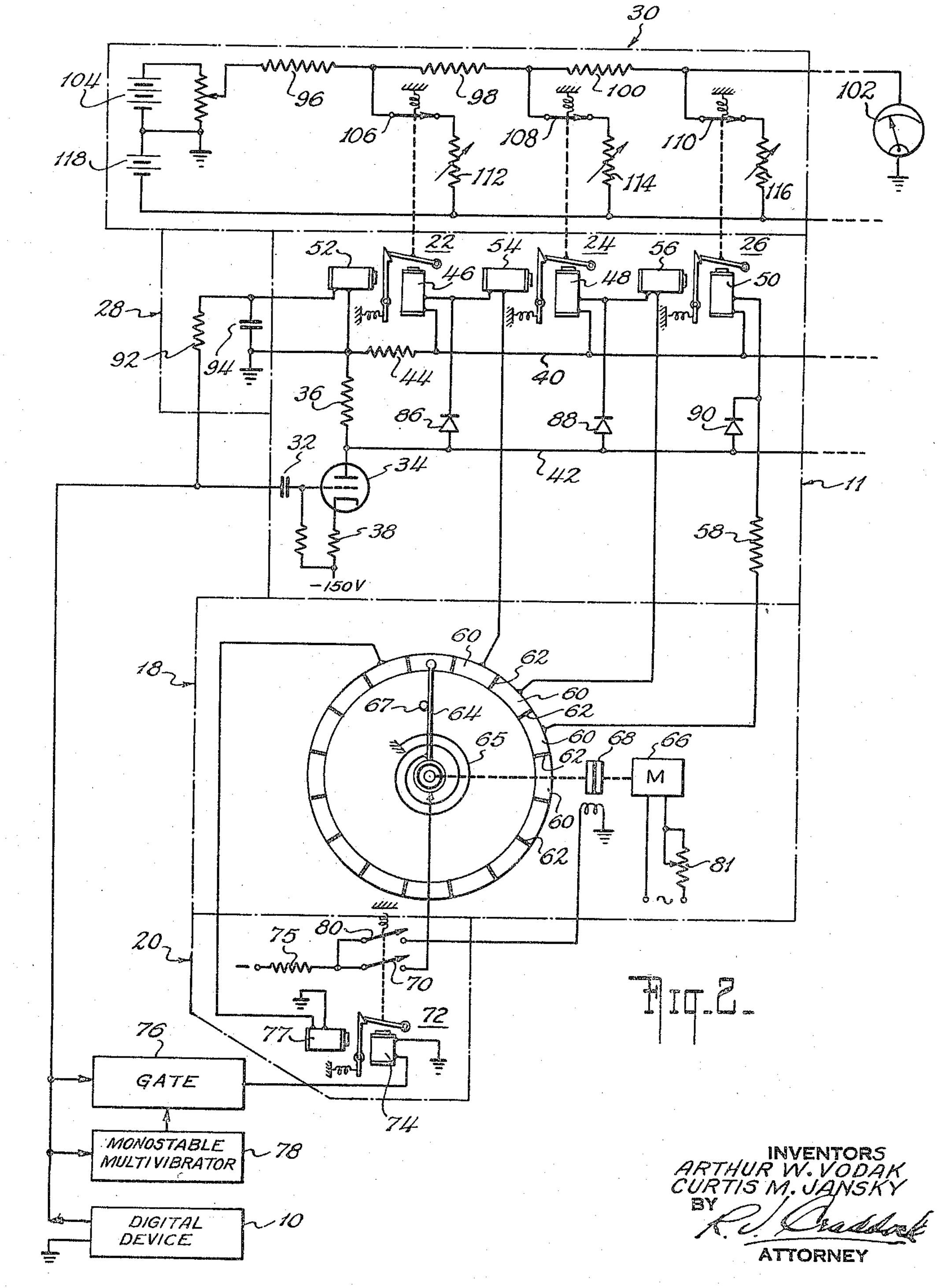
Fig. 2 is a schematic diagram of the data storage circuit.

Referring to Fig. 2, the schematic diagram for the storage and converter system shown in the block diagram in Fig. 1 is shown. The output from the digital device 10 is coupled through a capacitor 32 to the grid of a triode vacuum tube 34 having a plate load resistor 36 connected to ground. The triode 34 is normally biased to cut off. Self-biasing resistor 38 connects the cathode of the triode to a negative potential. A pair of busses 40 and 42 are connected to opposite ends of the plate load resistor 36, the buss 40 being preferably connected through a current limiting resistor 44 to the grounded end of the plate load resistor 36. Each of the latch-type relays 22, 24 and 26, respectively, has its respective setting coil, as indicated at 46, 48, and 50 respectively, connected to the buss 40. The clearing coils of each of the relays, as indicated at 52, 54, and 56 respectively, with the exception of the first relay 22, are connected in series with the setting coil of the preceding relay. Thus the setting coil 46 of the relay 22 is connected in series with the clearing coil 54 of the next relay 24 and the setting coil 48 of the relay 24 is connected in series with the clearing coil 56 of the next relay 26. The series connected setting coils and clearing coils in turn are connected back to the commutator circuit 18, with the setting coil 50 of the last relay 16 being connected back to the commutator circuit through a current limiting resistor 58 in place of a relay clearing coil as in the case of the previous relays.

While various known commutating means may be employed for successively passing current through the setting coils and series clearing coils of the relays in the storage circuit, one suitable mechanical commutator switch is shown. The commutating switch includes a plurality of conductive segments 60 arranged in a circle in conventional manner, the segments being insulated from each other by suitable insulators as indicated at 62. A rotary contact arm 64 driven by a motor 66 through an electrically operated clutch 68 successively connects each of the conductive segments of the commutator through a relay-operated switch 70 to a negative potential source (not shown) through high value resistor 75.

The initiating circuit 20, which actuates the commutator circuit 18 in response to a long pulse from the digital device 10, includes a latch-type relay 72, the setting coil 74 of which is connected through a gate circuit 76 to a monostable multivibrator type delay circuit 78. The gate is opened for the duration of the long pulse. The delayed output pulse produced by the multivibrator 78 passes through the gate and actuates the relay 72. The delay time is such that the gate will close before the delay pulse is produced if the gate is actuated in response to a digit pulse but will close after the delay pulse if the gate is actuated in response to synchronizing long pulse. The relay 72 in addition to actuating the relay switch 70 to connect the rotary arm of the commutator 64 to the negative potential source, also actuates a relay switch 80 which completes the circuit between the electrically operated clutch 68 and the negative potential source. Thus when the relay 72 is actuated in response to a long pulse from the digital device 10, the clutch is energized and the motor 66 begins to rotate the arm 64 of the commutator circuit 18. The rotational speed of the motor 66 is designed to rotate the arm 64 at a speed whereby the successive contacts 60 of the commutator circuit 18 are successively contacted substantially in synchronism with the successive digit intervals in the binary word. Thus the commutator switch of the circuit 18 completes a circuit to the setting coil 46 of the first relay 22 during the first digital pulse interval, and successively completes the circuit to the setting coils of the relay 24 and 26 during successive digit intervals of the digital device 10. For the limited number of digits generally employed in the binary word produced by the digital device 10, the speed of rotation of the arm 64 by the motor 66 can be preset, as by a rheostat 81, to maintain substantial synchronism with the corresponding digital pulse intervals of the binary word produced by the digital device 10.

The last segment of the commutator, before the arm completes one revolution, is connected so as to complete a circuit through the clearing coil 77 of the relay 72. As a result the clutch 68 is deenergized when the arm 64 reaches the last segment of the commutator. A spring 65 then returns the arm 64 to its initial position again at stop 67.

Each of the setting coils 46, 48, and 50 of the relays 22, 24, and 26 is connected to the buss 42 through a diode, such as indicated at 86, 88 and 90 respectively. The diodes are arranged to bypass a portion of the current which otherwise would flow through the setting coils 46, 48, and 50 of relays 22, 24, and 26 when connected to the negative potential source by the commutator circuit 18. The size of the resistors 36 and 44 are such that roughly three-fourths of the current is normally bypassed by the diodes. This insures that the current through the setting coil normally is not sufficient to energize the relay by the action of the commutator switching circuit 18 alone. However, when a pulse is received by the triode 34, the triode 34 is caused to conduct, which results in a drop in the potential on the plate, blocking the diode and causing the current through the setting coil of the relay to rise, assuring a substantially constant current source as provided by the large resistor 75 in series with the negative potential source. The increase in current through the setting coil is sufficient to energize the relay. Thus only if a pulse is received by the triode 34 during the interval in which the setting coil of a particular relay is connected by the commutating circuit 18 to the negative potential source, can the relay become energized.

Figure 3:
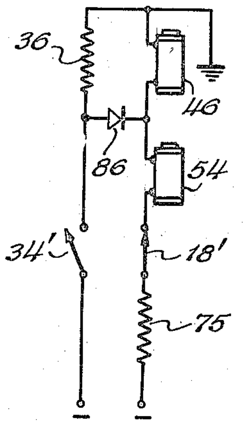
Fig. 3 is a simplified schematic diagram showing the operation of the "and" circuit in the data storage circuit of the present invention.

A simplified schematic circuit of the "and" circuit 12 is shown in Fig. 3. Triode 34 is represented by a switch 34′ and the commutator circuit 18 is indicated by a switch 18′. When the commutator switch 18′ closes completing a circuit through the relay clearing coil 54 of the relay 24 and the setting coil 46 of the relay 22, the switch 34′ is normally open, corresponding to the cutoff condition of the triode 34. It will be seen that the current flowing through the clearing coil 54 and resistor 75 will divide, part of it flowing through the plate load resistor 36 and diode 86 and part flowing through the setting coil 46. If a digital pulse, corresponding to the binary digit 1, is received by the triode 34 the effect is to close the switch 34′. In this condition the current through the clearing coil 54 and resistor 75 passes entirely through the setting coil 46. The resulting increase in current through the setting coil 46 is sufficient to energize the relay 22.

It will be noted that by putting the clearing coil of the next successive relay in series with the setting coil of the preceding relay, that the commutator circuit acts to clear each relay prior to the interval in which binary digital information to be stored on the relay is received from the digital device 10. The first relay 22 is cleared initially in response to the long pulse put out by the digital device 10 at the start of the binary word. Thus the output of the digital device 10 is coupled through an integrating circuit, constituting the initiating circuit 28 of Fig. 1, the integrating circuit including a resistor 92 and capacitor 94. The time constant of the integrating circuit is such that the clearing coil 52 of the first relay 12 is energized only in response to a pulse of the duration of the initial long pulse from the digital device 10.

From the description so far it will be seen that on the termination of a binary word from the digital device 10, the relays in the storage circuit 11 have a pattern established thereon in the form of energized or non-energized relays correspondng to the 1 digits and 0 digits in the binary word. The digital information as thus stored on the relays can be utilized for example, to produce an analog voltage by means of a suitable converter circuit, such as described in the above-mentioned Patent No. 2,658,139. Such a converter comprises a plurality of resistors 96, 98, and 100 connected in series with an output load, such as a voltmeter 102, across a potential source 104. The junction points between resistors are connected through relay operated switches 106, 108, and 110 and variable resistors 112, 114, and 116 to a negative potential source 118. The resistors 96, 98, and 100 are so proportioned that the sums of the individual resistances, going from left to right in the schematic of Fig. 2, follow a geometric progression having a ratio of 2. As taught in the above-identified patent, by adjusting the currents through the relay operated switches to be equal when the switches are closed, the voltage indicated by the voltmeter is the analog of the binary number established on the relays 22, 24, and 26.

From the above description it will be recognized that a storage circuit is provided by which binary digital information in serial form can be stored and converted to an analog voltage. The storage circuit is considerably less complex than known electronic shifting registers and other such digital circuits capable of performing the same function. The clearing arrangement has the advantage that the analog voltage output from the converter does not experience any large transients as would be the case if all the relays in the storage circuit were cleared simultaneously. This is particularly desirable, for example, where the analog output voltage from the converter 30 is used to operate a servomotor in an associated apparatus actuated in response to the binary digital information.

While the storage circuit has been described in conjunction with a particular commutating circuit, it is to be understood that the invention is not limited to such a commutating circuit. Other known commutating circuits, such as electronic counter circuits and the like, may be employed if desired. Likewise, the voltage divider type converter described is shown by way of example only. The information as stored on the relays may be utilized in various ways well known to the computer art.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A storage register for storing a binary word received in the form of pulses and no pulses during successive digit intervals indicative of the binary digits 1 and 0 respectively, preceded by an identifiable synchronizing pulse, said register comprising a plurality of latch-type relays, each relay including a setting coil and a clearing coil, a plurality of diodes, each setting coil having one of said diodes in series therewith, a triode stage including a plate load resistor and means for coupling the binary digit word pulses to the control grid thereof, means for coupling each of the relay setting coils and series diodes in shunt across the plate load resistor, each of the setting coils of all but one of the relays being connected in series with a respective one of the clearing coils of a different relay, whereby a plurality of separate series circuits, one less than the number of relays, are provided, each series circuit including the setting coil of one relay and the clearing coil of another relay, commutating means for successively connecting said separate series circuits to a source of current, the commutating means being arranged to switch the current source to successive series circuits at the repetition rate of the binary digit intervals, means for initiating the switching action of the commutating means in response to the synchronizing pulse, and means responsive to the synchronizing pulse for energizing the clearing coil of the first relay to have its setting coil energized by the commutating means.

2. A storage register for storing a binary word received in the form of pulses and no pulses during successive digit intervals indicative of the binary digits 1 and 0 respectively, preceded by an identifiable synchronizing pulse, said register comprising a plurality of latch-type relays, each relay including a setting coil and a clearing coil, a plurality of diodes, each setting coil having one of said diodes in series therewith, a grid-controlled vacuum tube stage including a plate load resistor and means for coupling the binary digit word pulses to the control grid thereof, means for coupling each of the relay setting coils and series diodes in shunt across the plate load resistor, each of the setting coils of all but one of the relays being connected in series with a respective one of the clearing coils of a different relay, whereby a plurality of separate series circuits, one less than the number of relays, are provided, each series circuit including the setting coil of one relay and the clearing coil of another relay, commutating means for successively connecting said separate series circuits across a source of current, the commutating means being arranged to switch the current source to successive series circuits at the repetition rate of the binary digit intervals, means for initiating the switching action of the commutating means in response to the synchronizing pulse, and means responsive to the synchronizing pulse for energizing the clearing coil of the first relay to have its setting coil energized by the commutating means.

3. A storage register for storing a binary word received in the form of pulses and no pulses during successive digit intervals indicative of the binary digits 1 and 0 respectively, preceded by an identifiable synchronizing pulse, said register comprising a plurality of latch-type relays, each relay including a setting coil and a clearing coil, a plurality of diodes, each setting coil having one of said diodes in series therewith, a grid-controlled vacuum tube stage including a plate load resistor and means for coupling the binary digit word pulses to the control grid thereof, means for coupling each of the relay setting coils and series diodes in shunt across the plate load resistor, each of the setting coils of all but one of the relays being connected in series with a respective one of the clearing coils of a different relay, whereby a plurality of separate series circuits, one less than the number of relays, are provided, each series circuit including the setting coil of one relay and the clearing coil of another relay, commutating means for successively connecting said separate series circuits across a source of current, the commutating means being arranged to switch the current source to successive series circuits at the repetition rate of the binary digit intervals and means for initiating the switching action of the commutating means in response to the synchronizing pulse.

4. A circuit for storing a binary word signal received in such form that the presence or absence of pulses during successive digit intervals indicate the binary digit 1 and 0, respectively, said circuit comprising a plurality of bistable elements having first and second inputs for triggering said elements respectively to one or the other of the stable conditions, commutating means for successively energizing a plurality of output terminals thereof at the repetition rate of the successive binary digit intervals, and a plurality of "and" circuits for producing an output signal only in response to a simultaneously received pair of input pulses, each of the "and" circuits having one input thereof coupled to a respective one of the output terminals of the commutating means and the other input thereof coupled to the binary word signal, the output of each "and" circuit being coupled to a respective one of the inputs of an associated one of the bistable elements, the remaining input of each of the bistable elements except one being coupled to the output terminal of the commutating means that is energized thereby just prior to the time of energizing of the output terminal coupled to the "and" circuit associated with said one input terminal of the respective bistable element, whereby successive bistable elements are preset by the commutating means.

5. Apparatus adapted to respond to a binary-encoded signal preceded by an initiating signal, said apparatus comprising a plurality of bistable elements each of whose states corresponds to a respective digit comprising said binary-encoded signal, each of said bistable elements having a first and a second input for setting each element to a predetermined opposite one of the stable conditions, commutating means having a plurality of output terminals corresponding in number to the number of said bistable elements, said output terminals being successively energized at the occurrence rate of the digits comprising said binary-encoded signal, a plurality of "and" circuits, each of the "and" circuits having one input thereof coupled to a respective one of the output terminals of the commutating means and another input adapted to receive the binary-encoded signal, the output of each "and" circuit being coupled to said first input of an associated one of the bistable elements, means for coupling said second input of each respective bistable element excepting one to an output terminal of said commutating means which is energized prior to the time the "and" circuit associated with said respective bistable element is energized by the commutating means, and means responsive to said initiating signal, the output of said last-named means being coupled to said second input of the excepted one of said bistable elements.

References Cited in the file of this patent

UNITED STATES PATENTS

| | | |
|---|---|---|
| 2,121,061 | Townsend | June 21, 1938 |
| 2,731,631 | Spaulding | Jan. 17, 1956 |
| 2,766,444 | Sheftelman | Oct. 29, 1956 |
| 2,775,727 | Kernahan et al. | Dec. 25, 1956 |